E. V. MYERS.
TIRE VALVE OR THE LIKE.
APPLICATION FILED MAR. 25, 1916.

1,338,245.  Patented Apr. 27, 1920.

WITNESSES:

INVENTOR:
Eugene V. Myers
By Attorneys,

UNITED STATES PATENT OFFICE.

EUGENE V. MYERS, OF EAST ORANGE, NEW JERSEY, ASSIGNOR TO A. SCHRADER'S SON, INC., OF BROOKLYN, NEW YORK, A CORPORATION OF NEW YORK.

TIRE-VALVE OR THE LIKE.

1,338,245.  Specification of Letters Patent. Patented Apr. 27, 1920.

Application filed March 25, 1916. Serial No. 86,742.

*To all whom it may concern:*

Be it known that I, EUGENE V. MYERS, a citizen of the United States of America, residing in East Orange, in the county of Essex and State of New Jersey, have invented certain new and useful Improvements in Tire-Valves or the like, of which the following is a specification.

This invention relates to tire valves or the like, and aims to provide certain improvements therein.

The ordinary standard type of pneumatic tire valve comprises a casing which is adapted to be secured to the inner tube or tire, and within this casing is located the working parts or so-called valve inside. Such valve inside usually comprises a valve seat provided with a packing adapted to make a tight joint with a tapered shoulder within the casing, a screw threaded plug which is usually swiveled to the upper side of the valve seat and which is adapted to engage internal threads on the casing to screw the seat down into place, and a valve proper located below the seat, these various parts being connected together to form a unitary structure. In the standard type of valve the screw-threaded plug is adapted to screw into the casing to a point which is well below the upper end of the casing. This is important since the valve inside then does not interfere in any way with the use of a valve cap or pump coupling. It results from this construction that the packing of the valve cap engages the outer end of the valve casing and thus makes a complete seal for the valve casing. If there is any leakage, either around the packing of the valve seat or around the valve proper and through the seat itself, such leakage is checked by the valve cap. Furthermore, in the case of the use of a pump coupling the packing of the coupling engages the outer end of the casing and forms a tight joint with the latter, so that in pumping the tire there is no chance of outward leakage around any parts of the valve inside. This construction involves, however, the screwing of the plug so far into the valve casing that it cannot be manipulated by hand, and in standard construction a valve cap has been employed which is provided with a screw driver projection adapted to enter into the top of the casing and engage a rib formed on the screw-threaded plug. The insertion or removal of the plug is hence not as easily performed as though the plug itself might be grasped by the user. It has heretofore been proposed to provide the plug with an integral manipulating flange projecting beyond the casing, which flange was adapted for manipulation by hand. Such constructions, however, have the vital objection that the flange lies in the way of the valve cap packing, so that the valve cap cannot make a complete seal for the casing, but only catches leakage through the valve itself, any leakage around the packing being unchecked. The same is true in case of a pump coupling. A further important objection is that as the packings of the valve cap and pump coupling are brought into direct contact with the screw-threaded plug or its equivalent, these have a strong tendency to unscrew the valve inside when being removed.

According to the present invention I provide a structure in which the valve inside is adapted to be completely housed in the valve casing so as to leave the upper edge of the casing free to receive the packing of a valve cap or pump coupling, while at the same time I provide a means adapted to extend from the valve inside outwardly to a position where it can be conveniently grasped by the fingers, in order that the use of a cap or other tool for screwing in or unscrewing the valve inside is avoided. To this end, in the preferred form of the invention I provide a structure in which a movable part is connected with the valve inside, such movable part having a sliding and non-rotative connection with the valve inside, which permits it to extend beyond the casing while in use as a manipulating member, and to lie within the casing to permit the use of a valve cap or pump coupling. Preferably a spring is employed which is adapted to normally hold said part in its outer position, but which is adapted to yield when pressed downwardly by the valve cap or pump coupling, so that it does not interfere with the complete sealing of the casing.

Referring to the accompanying drawings which illustrate several forms of the invention,—

Figure 1:
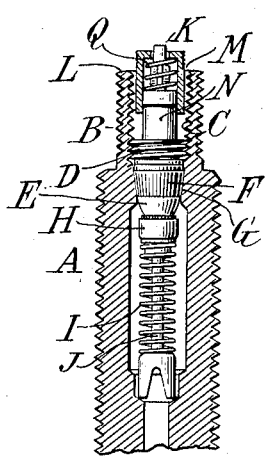
Figure 1 is a diametrical section of a valve casing showing the invention as applied thereto, the manipulating member being in its uppermost position.
Figure 2:
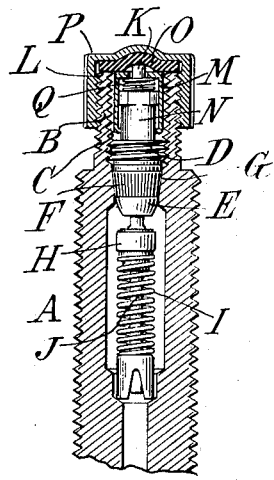
Fig. 2 is a similar view showing the manipulating member housed within the casing.
Figure 3:
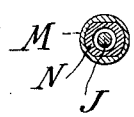
Fig. 3 is a cross section of the valve inside.

Referring first to Figs. 1 to 3 of the drawings, let A indicate the valve casing as a whole, having usually formed at its top an integral nipple B. The nipple B is customarily screw-threaded internally, as shown at C, to engage a valve plug D. The latter in the standard construction is swiveled to a seat member E which is provided with a packing F adapted to seat against a shoulder G. H is the valve proper or check member, which is adapted to co-act with the lower edge of the seat member E, being usually yieldingly held in its uppermost position by spring I. A pin such as J in this construction connects the various parts together and protrudes beyond the end of the valve casing, as shown at K, so that the valve proper may be pressed open for the purpose of deflation, gaging, etc.

According to the present invention means are provided for screwing and unscrewing the plug D, which means are adapted to be depressed to a point at or below the upper edge L of the nipple B. Such means may be variously constructed, but in Figs. 1 and 2 I have shown a sleeve M which is telescopically connected with a reduced extension N of the plug. Such extension N is flattened, or of other non-circular contour, and the internal shape of the sleeve M is of similar contour, so that the two parts are non-rotatably connected. The upper end of the sleeve M may be roughened, if desired, to secure a better finger-hold. It will be observed that when the sleeve is in its extended position it may be readily manipulated to screw and unscrew the plug, but when it is in its retracted position it does not interfere with the packing O or the cap P in making a tight joint with the upper edge L of the nipple. Preferably the top of the sleeve in its extreme inward position lies slightly below the top edge of the nipple in order that when the packing is compressed it will not exert any deleterious pressure against the sleeve. The sleeve may be provided with a small grasping portion centrally arranged so that it does not interfere with the cap or pump coupling, and by means of which the sleeve may be pulled upwardly in case the valve happens to be in an upright position on the wheel. I prefer, however, to provide a small spring such as Q beneath the sleeve, which will normally hold it in its upper position. This spring is preferably of like proportions, so that as a cap or pump coupling is screwed downwardly and depresses the sleeve there will be insufficient friction between the two to tend to rotate the plug.

Figure 4:
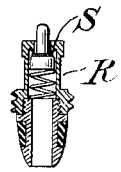
Fig. 4 is a diametrical section of a part of the valve inside with the manipulating member removed.
Figure 5:
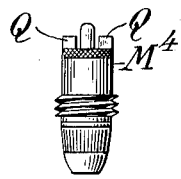
Fig. 5 is an elevation of a slightly modified form of valve inside.

In Figs. 4 and 5 I have shown the invention as applied to a construction in which the valve proper is held in a shell R, the seat S being formed within the shell as shown in Fig. 4. In this latter figure the manipulating sleeve M⁴ is not shown. It may take the construction of Figs. 1 or 3 of the drawing, or it may be provided with lugs Q Q by which it may be engaged by the ordinary valve cap, or any other screw driver arrangement may be adopted.

Figure 6:
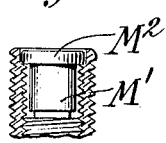
Fig. 6 is a detailed view of another modification.
Figure 7:
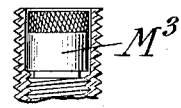
Fig. 7 is a similar view of another modification.

In Fig. 6 I have shown a construction in which sufficient of the internal screw-thread of the nipple is omitted to receive a flange M² which is formed at the top of the sleeve M'. In Fig. 7 a greater portion of the thread is omitted, so that the entire sleeve M³ is of enlarged diameter. The constructions of these figures is applicable to the construction of Figs. 4 and 5, or any other suitable construction.

The invention is applicable to other constructions of valve, those shown being selected for illustration.

It will be observed that the present invention secures certain advantages over the constructions heretofore known, in that a construction is provided which can be completely sealed by a valve cap or pump coupling, and by means of which the valve inside may be removed without resort to a special tool.

It will be understood that I do not wish to be limited to the constructions herein shown and described, since various changes may be made therein without departing from the invention.

I claim as my invention:—

1. For pneumatic tire valves or the like, a valve and a part normally lying at or near the top of the valve casing when the valve is in working position in the casing, and said part being adapted to move outwardly with reference to the valve while the valve is still in such position and form a manipulating member for removing such valve.

2. For pneumatic tire valves or the like, a valve inside comprising a valve and its seat, the seat having a part normally lying at or near the top of the valve casing when the inside is in working position in the casing and said part being adapted to move outwardly relatively to the seat while the inside is still in such position and form a manipulating member for removing such inside.

3. For pneumatic tire valves or the like, a valve inside comprising a valve seat, a valve connected to said seat and a plug connected to said seat, and an extensible and retractible manipulating part connected to the plug and adapted when the seat is in working position in the casing to lie beneath the top of the valve casing and also be extended beyond such top to form a manipulating member for removing such inside.

4. For pneumatic tire valves or the like, a valve inside having a screwthreaded part carrying a seat and a valve coöperating with said seat, and a manipulating part non-rotatively connected to said seat and also extensibly and retractably connected therewith, said manipulating part when said seat is in its working position adapted to lie at or below the top of the valve casing and also adapted to be extended beyond such top whereby it may be grasped to unscrew said seat.

5. For pneumatic tire valves or the like, a valve seat having a screwthread and adapted to screw inside of the valve casing to a point approximating the top of the latter, and a manipulating part adapted to enter the valve casing and to move from said position to a point above the top of the casing, while the seat is in operative position.

6. For pneumatic tire valves or the like, a valve seat having a screwthread and adapted to screw below the top of a valve casing, and a manipulating part for said seat normally lying at or below the top of the casing and adapted to be extended above said top while the seat is in operative position, said manipulating part comprising a sleeve.

7. For pneumatic tire valves or the like, a valve and its seat, the seat having a sliding manipulating part permanently and non-rotatively connected thereto and independent of the valve, and means for moving said part.

8. For pneumatic tire valves or the like, a valve seat having a sliding manipulating part and a spring for moving said part.

9. The combination with a valve casing or the like, of a valve inside including a screwthreaded seat and a sliding manipulating part for unscrewing said seat, said part being movable to a point above the top of the casing, and being also movable to a point substantially within the casing.

10. The combination with a valve casing or the like, of a valve inside including a valve and a seat having a manipulating part independent of the valve adapted in one position to lie above the top of the casing and in another position to lie below the first position, and said part having a non-rotative connection with said valve inside.

11. The combination with a valve casing or the like, of a valve inside including a screwthreaded seat and a valve proper, and having an extensible and retractable manipulating part for removing it adapted to lie sufficiently inward in one position to permit a valve cap or pump coupling to make a tight joint with the top edge of the valve casing, and sufficiently outward in another position to provide a manipulating part for unscrewing said inside.

12. The combination with a valve casing or the like, of a valve inside including a screwthreaded seat and a valve proper, and having an extensible and retractable manipulating part for removing it adapted to lie sufficiently inward in one position to permit a valve cap or pump coupling to make a tight joint with the top edge of the valve casing, and sufficiently outward in another position to provide a manipulating part for unscrewing said inside, and means whereby said part may be extended to its outward position.

13. The combination with a valve casing or the like, of a valve inside including a screwthreaded seat and a valve proper, and having an extensible and retractable manipulating part for removing it adapted to lie sufficiently inward in one position to permit a valve cap or pump coupling to make a tight joint with the top edge of the valve casing, and sufficiently outward in another position to provide a manipulating part for unscrewing said inside, and a spring for extending said part to its outward position.

14. For pneumatic tires or the like, a valve inside comprising a valve and seat, said seat having a manipulating part independent of the valve and slidingly and non-rotatively connected with said seat and provided with a flange at its top.

15. The combination with a valve casing or the like having an internal screw-thread of a valve inside comprising a valve and its seat adapted to screw into said casing and a sliding manipulating part for said valve inside, a part of said internal screw-thread being omitted to form an enlarged recess for the manipulating part, said recess and part being proportioned so that the part may be substantially housed within the recess.

16. For pneumatic tire valves or the like, a valve inside comprising a valve and its seat, said inside adapted to be inserted and removed bodily from a valve casing, and having a part normally lying at or near the top of the valve casing when the inside is in working position in the casing, and said part being adapted to move outwardly while the inside is still in such position and form a manipulating member for removing such inside.

In witness whereof I have hereunto signed my name in the presence of two subscribing witnesses.

EUGENE V. MYERS.

Witnesses:
GRACE GUNDERMAN,
THOMAS F. WALLACE.